Dec. 11, 1934.　　　I. A. WYANT ET AL　　　1,984,169

WHEEL HUB AND BRAKE DRUM

Filed Jan. 16, 1933　　　2 Sheets-Sheet 1

Inventors
Ira A. Wyant
Charles W. Dake
By Liverance
and
Van Antwerp
Attorneys

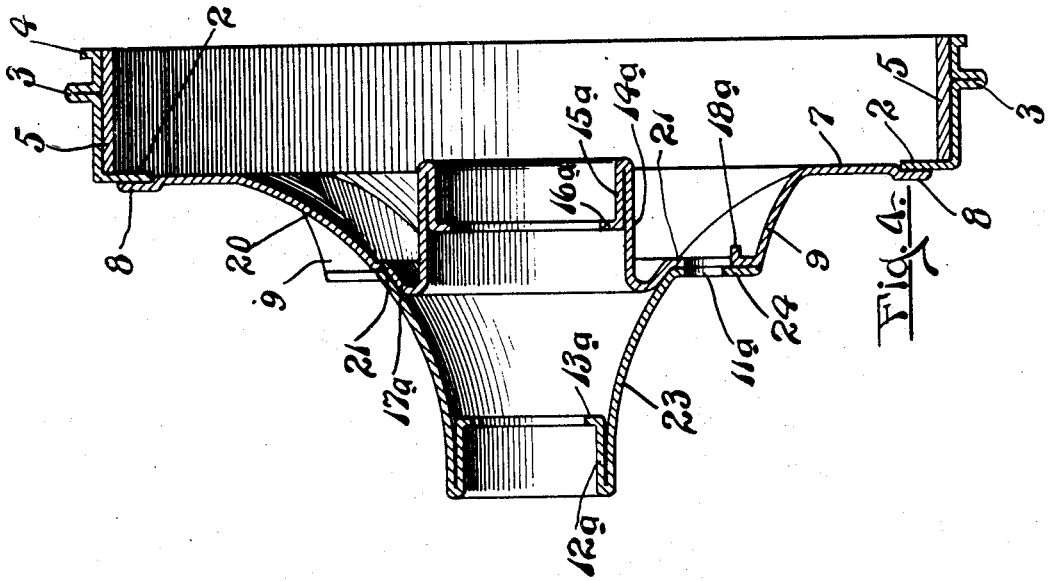
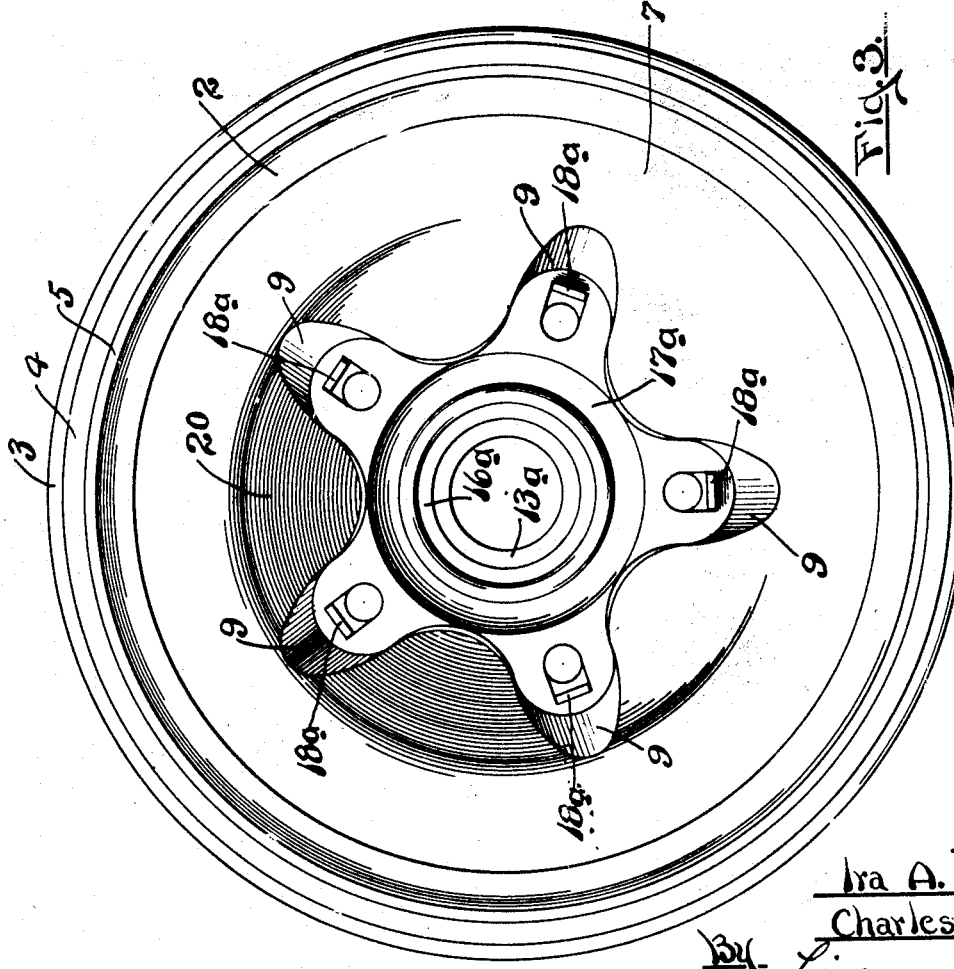

Patented Dec. 11, 1934

1,984,169

UNITED STATES PATENT OFFICE 1,984,169

WHEEL HUB AND BRAKE DRUM

Ira A. Wyant, Muskegon, and Charles W. Dake, Grand Haven, Mich., assignors to Campbell, Wyant & Cannon Foundry Company, Muskegon, Mich., a corporation of Michigan Application January 16, 1933, Serial No. 651,876

4 Claims. (Cl. 301—6)

This invention relates to wheels for vehicles, particularly motor vehicles, and is more especially concerned with a hub construction for wheels of this character with associated parts, such as a brake drum, which may be directly connected with and in effect form an integral part of the hub construction.

It is an object and purpose of the present invention to provide a sheet metal hub and brake drum construction for motor vehicles, fabricated in a novel manner so as to reduce the cost of manufacture of such parts. A further object of the invention is to build the hub construction and the combined hub and brake construction of such form that it may be made up of parts readily drawn or pressed from sheet metal, or other suitable sheet or plate metal, and secure the parts together in a very simple and practical manner to obtain a uniform strength throughout the construction. It is a still further object of the invention to provide as one part of the construction a brake drum which consists of an outer supporting shell of sheet steel or the like lined with cast iron, thereby providing the most desirable braking surface, and to so construct this part of the construction and form the immediate hub construction to complement the same in such a manner that the two are very simply and easily permanently connected together by welding or other equivalent method of connection.

An understanding of the invention may be had from the following description, taken in connection with the accompanying drawings, in which, Fig. 1 is a central longitudinal axial section through the combined hub and brake drum.

Fig. 3 is a view similar to Fig. 2 of a slightly different form of construction embodying the same invention, and Fig. 4 is a section similar to that shown in Fig. 1 of the form of construction illustrated in Fig. 3.

Like reference characters refer to like parts in the different figures of the drawings.

Figure 2:
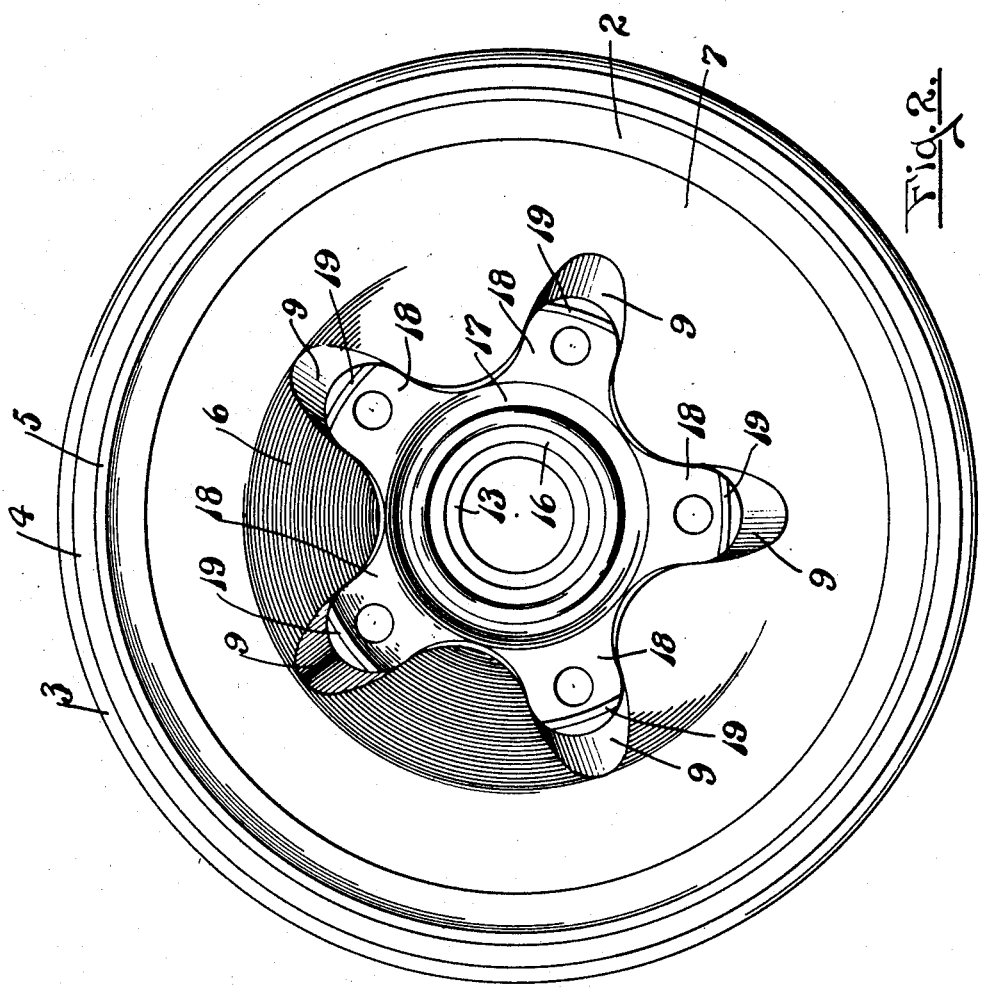
Fig. 2 is an end elevation thereof looking at the same from the right.
Figure 1:
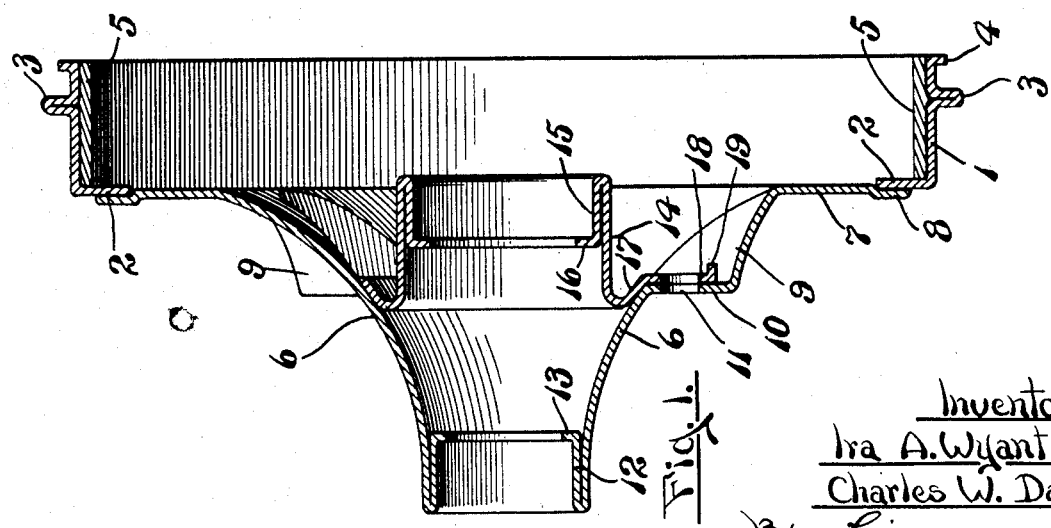

The combined hub and brake construction illustrated in Figs. 1 and 2 consists of three parts. One is the brake drum per se, consisting of an outer cylindrical shell 1 of sheet steel pressed or rolled or otherwise formed into shape which at one edge has an inturned annular flange 2. The shell may be formed with a continuous annular rib 3 as shown, or more than one of said ribs may be formed thereon, and at the free edge of the shell it may be provided with a short annular sealing flange 4. This shell is designed to be lined at its inner curved surface with a continuous relatively thin band 5 of cast iron which is centrifugally cast thereagainst and fused continuously to the outer supporting shell, making use of the process of centrifugally casting and continuously fusing the cast iron band as disclosed in the prior pending application of Donald J. Campbell, Serial No. 512,792, filed February 2, 1931, and other pending applications of said Donald J. Campbell such as Serial No. 573,949.

A second member of the construction is formed from sheet steel or other equivalent plate metal and pressed into a hub housing 6 of the form shown from which an annular flange 7 in a vertical plane extends at one end, the same at its peripheral edges being slightly offset, as indicated at 8, whereby the flange 2 of the brake drum shell 1 may seat against said offset and be permanently connected therewith as by welding.

At equally spaced distances around the hub 6 the metal is pressed to provide embossings 9, each of which has a vertical end 10 with an opening 11 therein for the passage of spoke securing bolts. The hub 6, at its end farthest away from the brake drum, has an integral bearing cup formed therein by return bending the metal and pressing the same within the end of the hub member 6, as indicated at 12, and making an opening surrounded by a continuous annular flange 13 as shown for the passage of the axle, a bearing between the end of the hub and the axle to be carried within said cup.

The third member of the construction consists of a cylindrical member 14 of sheet metal in the end of which, farthest away from the bearing cup 12, a second bearing cup is formed in substantially the same manner, that is, by return bending the metal of the cylinder 14 at one end into the cylindrical member 14, as indicated at 15, and providing an opening in the bottom of the cup for the passage of the axle which opening is surrounded by an annular flange 16. The opposite end of the cylinder 14 is return bent and extended outwardly, as indicated at 17, and at spaced intervals around the outer edge of the part 17 ears 18 extend therefrom to enter the recesses of the embossings 9 and bear against the inner sides of the vertical ends 10 of said embossings. Said ears 18 have openings to aline with the openings 11 and each ear at its free end is formed with a lip 19 turned at right angles to serve as holders or retainers for nuts at the inner ends of the spoke securing bolts.

In Fig. 3 the construction described is changed slightly. The brake drum member remains the same as previously described. The hub member is formed with two parts, each of the parts carrying a bearing cup. The portion of the hub member nearest the brake drum comprises an annular section 20 of the form shown, from which the flange 7 extends with the offset portion 8 to be joined to the flange 2 of the brake drum shell. The part 20 is continued in a section 17a similar to the section 17 previously described and from which an inner bearing cup construction extends consisting of the parts 14a, 15a and 16a similar in all respects to the parts 14, 15 and 16 previously described with reference to Fig. 1. The embossings or pressed out portions 9 are made at spaced intervals around the part 20, having openings therethrough for the passage of spoke securing bolts, and in making said openings a part of the metal is turned at right angles as indicated at 18a, to form the retainers for the nuts at the inner ends of said bolts. Between the parts 17a and 20 the metal is pressed inward annularly making a shoulder 21 as shown in Fig. 4.

The third member of the construction shown in Fig. 4 is an outer hub section 23 having ears 24 extending therefrom to lie against the outer sides of the ends of the embossings 9 and with openings 11a therethrough for passage of the spoke securing bolts. The outer end of the member 23 is provided with a bearing cup 12a, 13a similar in all respects to the bearing cup 12, 13 previously described.

It is evident that with this construction a complete assembly of vehicle wheel hub and brake drum may be provided, with the necessary bearing holding cups, and readily and easily connected together, all parts being of sheet or plate metal which may be quickly and easily and uniformly fabricated by using suitable dies for such purpose. The cost of manufacture is low and the production of the combined hub and brake drum assembly is very economical. The connection of the sheet metal parts together at their contacting portions is very easily performed by electric welding. There is no machining required on the assembled construction except the inner braking surface of the brake drum 5 and the free annular edge portions of the brake drum.

The constructions thus described may be varied in details without departing from the invention. The invention is defined in the appended claims and is to be considered comprehensive of all forms of structure coming within their scope.

We claim:

1. A device of the class described comprising a drawn steel hub member progressively enlarging from its outer end toward its inner side and formed with a plurality of spaced apart outwardly extending embossed portions around it, the inner side of said hub member comprising an outwardly extending flange adapted to be located substantially in a radial plane, an inner hub member of annular shape comprising a bearing cup and ears extending therefrom at one end to enter said embossed portions, said ears and the outer ends of said embossings having alined openings, and a brake drum supporting shell of like metal welded to said vertical flange.

2. A device of the class described comprising a drawn steel hub member progressively enlarging from its outer end toward its inner side and formed with a plurality of spaced apart outwardly extending embossed portions around it, the inner side of said hub member comprising an outwardly extending flange adapted to be located substantially in a radial plane, and an inner hub member of annular shape comprising a bearing cup and ears extending therefrom at one end to enter said embossed portions, said ears and the outer ends of said embossed portions having alined openings.

3. A device of the class described comprising a drawn steel hub member progressively enlarging from its outer end toward its inner side and formed with a plurality of spaced apart outwardly extending embossed portions around it, the inner side of said hub member comprising an outwardly extending flange adapted to be located substantially in a radial plane, and an inner hub member of annular shape comprising a bearing cup having a radially extending portion located against and adapted to be fastened to the inner side of said hub, said embossed portions being located radially outward from the innermost points of contact between the inner side of the hub and the radially extending portion of the cup.

4. A construction consisting of a hub gradually increasing in size from its inner end and having a concentrically curved surface and terminating in a radial flange and a second member having a cylindrical sleeve and a radially extending portion integral therewith, said portion having a complementary concentrically curved surface adapted to be located adjacent to the first mentioned concentrically curved surface of the hub whereby exact alinement of the cylindrical sleeve within the hub is had.

IRA A. WYANT.
CHARLES W. DAKE.